Figure 1:
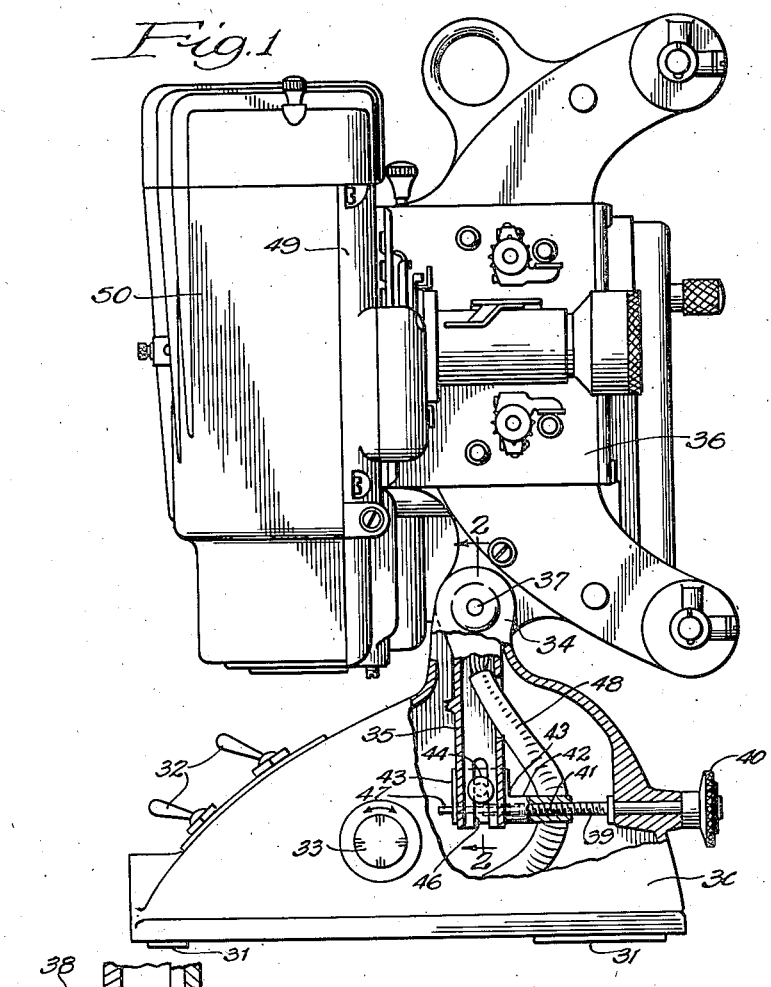

March 9, 1943.   T. J. MORGAN ET AL   2,313,663
CINEMATOGRAPH
Original Filed April 15, 1940

Inventors:
Thomas J. Morgan and
Arthur S. Dearborn,
By Evans, Pond & Anderson,
Attorneys.

Patented Mar. 9, 1943

2,313,663

UNITED STATES PATENT OFFICE 2,313,663

CINEMATOGRAPH

Thomas J. Morgan and Arthur S. Dearborn, Chicago, Ill., assignors to Ampro Corporation, a corporation of Illinois Original application April 15, 1940, Serial No. 329,784. Divided and this application July 21, 1941, Serial No. 403,371

5 Claims. (Cl. 248—11)

This application is a division of co-pending application Serial No. 329,784, filed April 15, 1940, and this application is directed particularly to the improved mechanism for tilting the projecting mechanism on a base.

The main objects of the invention are to provide in a cinematograph a simple but efficient arrangement for controlling the angular adjustment of the device; to provide adjusting means for the purpose indicated which will be very positive in operation but will afford smooth and gradual adjustment; to provide such adjusting means which will be low in cost of production and well adapted to large scale production methods.

Other objects and advantages of the invention will be understood by reference to the following specification and accompanying drawing, wherein there is illustrated a cinematograph embodying a selected form of the invention.

In the drawing—

Figure 2:
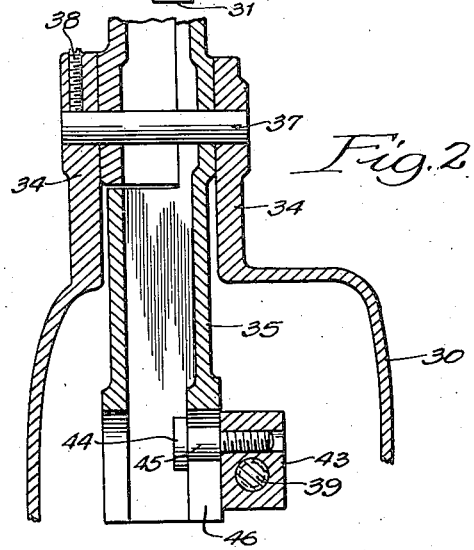

Fig. 1 is a side elevation, certain parts being broken away and shown in section to reveal some of the details of construction; and Fig. 2 is a fragmentary section on the line 2—2 of Fig. 1.

Referring now to the drawing, the improved cinematograph herein shown comprises a metal base member 30 of hollow form and preferably provided with suitable cushioned feet 31, 31, the same being secured to the bottom of the base in any selected manner. The hollow base 30 may have mounted on it suitable electric switches indicated at 32 for controlling electric circuits to a main driving motor and the lamp. If desired, a switch may also be provided for controlling a motor reversing circuit. A rheostat 33 may also be mounted on the base for controlling the speed of operation of the main driving motor.

The base 30 is provided with spaced upstanding lugs or ears 34, 34 (see Figure 2) which are adapted to receive between them a stem 35 which depends from the main housing structure 36 of the device. The stem 35 is preferably formed or cast integrally with the said main housing 36 and it is provided with suitable bosses as best shown in Figure 2 to cause it to fit snugly between the upstanding ears 34, 34 of the base. The housing 36 and the adjacent portion of the stem 35 may be formed of two parts, one of which is detachably connected but normally rigidly secured to the main member 36, this construction being preferable for certain practical reasons but unimportant so far as the mounting of the main housing 36 on the base is concerned.

A pivot pin 37 extends through the base lugs 34, 34 and the interposed portion of the stem 35, so that the parts are pivotally connected and said pivot pin may be suitably locked in place as for example by a set screw 38.

For controlling the angular relation of the main housing 36 to the base 30, the base is provided with a screw member 39 anchored to the base as clearly shown in Figure 1 against longitudinal shifting movement.

A knurled knob 40 is provided for facilitating manual rotation of the screw 39 and the screw threaded portion 41 thereof threadedly engages a tubular member 42 which is connected to the stem 35 through the agency of an integrally formed enlarged end part 43 and a headed pin 44. The headed member 44 may be in the form of a shouldered screw as shown in Figure 2 which is seated in the enlarged portion 43 of the sleeve, the shouldered portion 45 of the screw being slidable in a slot 46 provided in the stem 35. The screw 41 preferably is provided with a reduced free end portion 47 and the sleeve member 42 is preferably so formed as to provide, at its outer end, a bearing for said reduced end portion 47, thereby insuring smoothness and ease of operation at all times.

A flexible tube 48 is preferably provided for conducting wires from the switches 32 and rheostat 33 in the base to the main housing 36, and, as shown in Figure 1, the stem 35 is hollow and apertured to permit said conduit 48 to be directed into said stem. Thus the electrical wiring present in the hollow base 30 is protected. A suitable bottom plate (not shown) is also preferably provided for closing the bottom of the hollow base.

The pivotally supported main housing member 36 has attached to it, in addition to certain covers or cover plates, a housing section 49 and a lamp housing 50. Certain operating mechanism is located within the space provided between the intermediate section 49 and the rear wall of the housing 36 and the lamp and cooling fan are located within the rear housing part 50.

It will be apparent that by rotating the knurled knob 40, the stem 35 and with it the housing structure 36 will be rocked about the pivot 37. Inasmuch as the adjusting screw 39 and nut 41 are, in effect, self-locking, the adjusted position of the projector housing will remain without further locking in accordance with the adjustment effected through the agency of the knob 40 and screw 39. The screw adjustment described affords more than ample mechanical power for transmitting rotation of the screw 39 into rocking movement of the housing structure 36 so that such adjustment may be very easily effected and the adjustment is positive and gradual or smooth.

Changes in the described construction may be made without departing from the spirit of the invention, the scope of which should be determined by reference to the following claims, the same being construed as broadly as possible consistent with the state of the art.

We claim:

1. In a cinematograph, a hollow base, electrical controls mounted on said base, projecting mechanism having a hollow stem extending into said base, means pivotally interconnecting said base and said projecting mechanism, screw means interconnecting said base and a portion of said hollow stem and adapted, upon rotation of the screw, to effect pivotal movement of said projecting mechanism, said stem having an opening in its side affording access to the interior thereof, and electrical wires extending from said controls through said opening and said hollow stem into said projecting mechanism.

2. In a cinematograph, a hollow base, a projecting mechanism head pivotally mounted on said base and having a rigid hollow stem projecting beyond said pivotal mounting into said base, an axially elongated nut connected to said stem so as to be slidable longitudinally thereof but relatively immovable transversely, a screw rotatably mounted in said base and anchored thereto against longitudinal movement, said screw having an inner end portion rotatably and slidably journaled in an end portion of said nut, an intermediate portion threadedly engaging said nut and an outer portion provided with a knob accessible on the outside of said base for facilitating manipulation of said screw, electrical controls mounted on said base, and electrical connecting wires extending from said controls within said base upwardly through said hollow stem into said projecting head, said hollow stem being provided with an opening in its side wall above the slidable connection between said nut and stem, said opening serving to permit passage of said connecting wires from the interior of the base into said stem.

3. In a cinematograph, a hollow base, electrical controls mounted on said base, projecting mechanism having a hollow stem extending into said base, means pivotally interconnecting said base and said projecting mechanism, screw means interconnecting said base and a portion of said hollow stem and adapted, upon rotation of the screw, to effect pivotal movement of said projecting mechanism, and electrical wires extending from said controls through said hollow stem into said projecting mechanism.

4. In a cinematograph, a hollow base, a projecting mechanism head pivotally mounted on said base and having a rigid stem projecting beyond said pivotal mounting into said base, an axially elongated nut connected to said stem so as to be slidable longitudinally thereof but relatively immovable transversely, a screw rotatably but axially fixedly mounted in said base and anchored thereto against longitudinal movement, said screw having an outer portion provided with a knob accessible on the outside of said base for facilitating manual rotation of said screw, an intermediate portion threadedly engaging said nut, and an inner end portion of reduced diameter slidably journalled in another portion of said nut, there being a shoulder at the junction of said reduced end portion and said screw-threaded portion and said shoulder being adapted to limit movement of said nut along said screw, and said reduced end portion being adapted to maintain alignment of the screw and nut in the event of disengagement of the screw-threaded portion of the screw from the screw-threaded portion of the nut.

5. In a cinematograph, a hollow base, electrical controls mounted on said base, projecting mechanism having a hollow stem extending into said base, means tiltably mounting said projecting mechanism on said base, adjustable means interconnecting said base and a portion of said hollow stem for effecting tilting adjustment of the mechanism relative to the base, and electrical wiring extending from said controls through said hollow stem into said projecting mechanism.

THOMAS J. MORGAN.
ARTHUR S. DEARBORN.

CERTIFICATE OF CORRECTION.

Patent No. 2,313,663. March 9, 1943.

THOMAS J. MORGAN, ET AL.

It is hereby certified that error appears in the above numbered patent requiring correction as follows: In the grant, lines 1 and 2, for "THOMAS J. MORGAN and ARTHUR S. DEARBORN, of Chicago, Illinois" read --THOMAS J. MORGAN, of Chicago, and ARTHUR S. DEARBORN, of Hinsdale, Illinois--; and in the heading to the printed specification, lines 3 and 4, for "Thomas J. Morgan and Arthur S. Dearborn, Chicago, Ill." read --Thomas J. Morgan, Chicago, and Arthur S. Dearborn, Hinsdale, Ill.--; and that the said Letters Patent should be read with this correction therein that the same may conform to the record of the case in the Patent Office.

Signed and sealed this 11th day of May, A. D. 1943.

(Seal)

Henry Van Arsdale,
Acting Commissioner of Patents.